Figure 1:
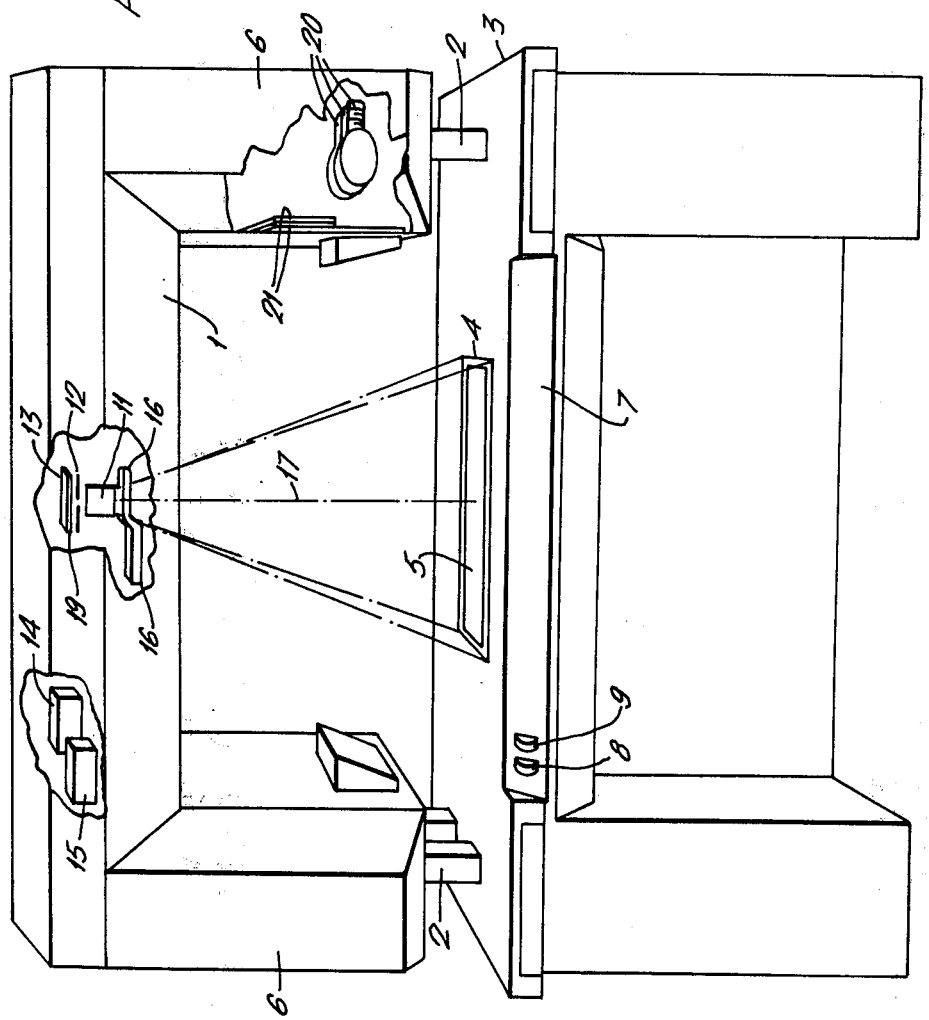

United States Patent [19]

Spence-Bate

[11] 4,161,709
[45] Jul. 17, 1979

[54] MICROFORM CAMERA

[76] Inventor: Harry A. H. Spence-Bate, 1 Cheam Pl., Morley, Western Australia, Australia, 6062

[21] Appl. No.: 862,566

[22] Filed: Dec. 20, 1977

[30] Foreign Application Priority Data

Dec. 22, 1976 [GB] United Kingdom ............... 53544/76

[51] Int. Cl.$^2$ ...................... G03B 27/76; G03B 27/78; G03B 27/32
[52] U.S. Cl. ........................................ 355/38; 355/20; 355/64
[58] Field of Search .................... 354/270; 355/20, 77, 355/32, 35, 37, 38, 67–71, 64

[56] References Cited

U.S. PATENT DOCUMENTS

| | | | |
|---|---|---|---|
| 2,952,188 | 9/1960 | Bang | 355/68 X |
| 3,006,260 | 10/1961 | Smith et al. | 355/20 |
| 3,402,636 | 9/1968 | Gemmer et al. | 355/68 |
| 3,459,888 | 8/1969 | Sokolov | 355/20 |
| 3,801,198 | 4/1974 | David | 355/32 |
| 3,826,571 | 7/1974 | Spence-Bate | 355/20 X |
| 3,836,246 | 9/1974 | Bowker | 355/71 X |
| 3,887,279 | 6/1975 | Rubin | 355/38 |
| 3,914,721 | 10/1975 | Pollock | 355/37 X |
| 3,947,112 | 3/1976 | Hahn et al. | 355/70 X |
| 4,056,317 | 11/1977 | Lewis | 355/32 |

FOREIGN PATENT DOCUMENTS 1009346  11/1963  United Kingdom ...................... 355/32

*Primary Examiner*—Donald A. Griffin
*Attorney, Agent, or Firm*—Fidelman, Wolffe & Waldron

[57] ABSTRACT

A microform document and information recording camera such as a microfiche or microfilm camera having a color indicating means, preferably a rotatable drum or drums indicating predominant colors which can be manually or automatically set to coincide with predominant colors being recorded and which is arranged to set the timing of a shutter to a correct exposure for the predominant color and/or to insert a filter into a path between the camera lens and the front focal plane of the lens with the possibility of controlling lighting and lighting filters arranged to illuminate a record on a record copying platen; in one embodiment a cathode ray tube can provide an alternative image source and in which case the color indicating means is automatically set when the cathode ray tube is in operation.

15 Claims, 7 Drawing Figures

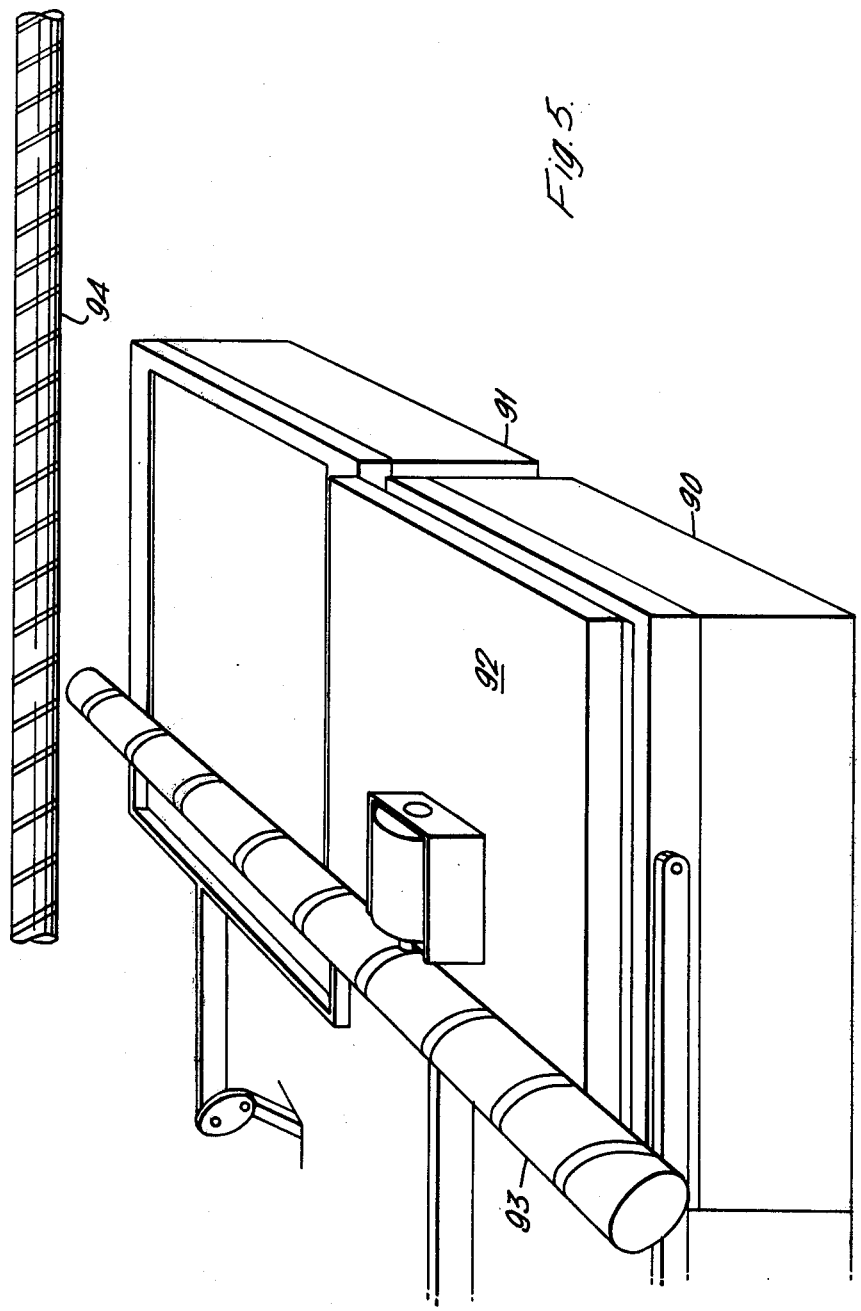

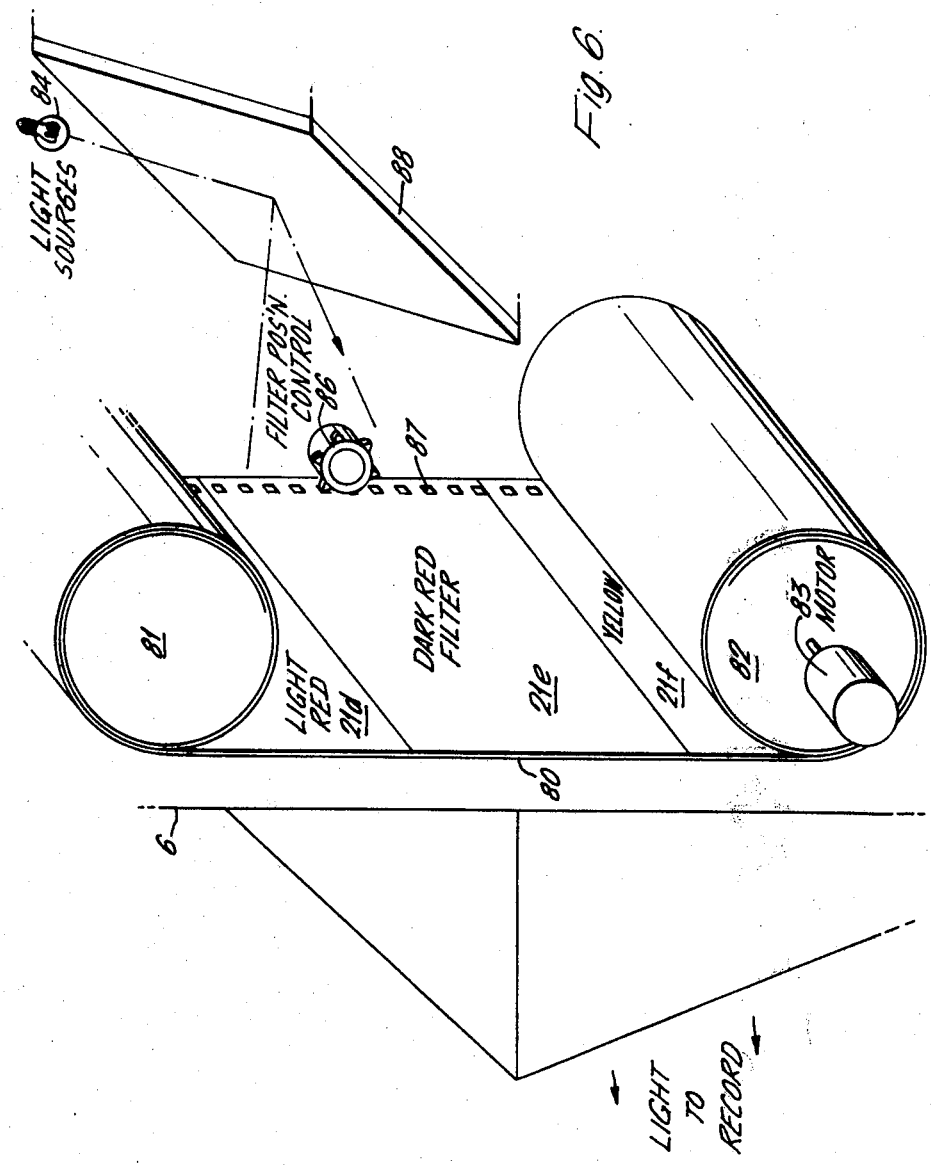

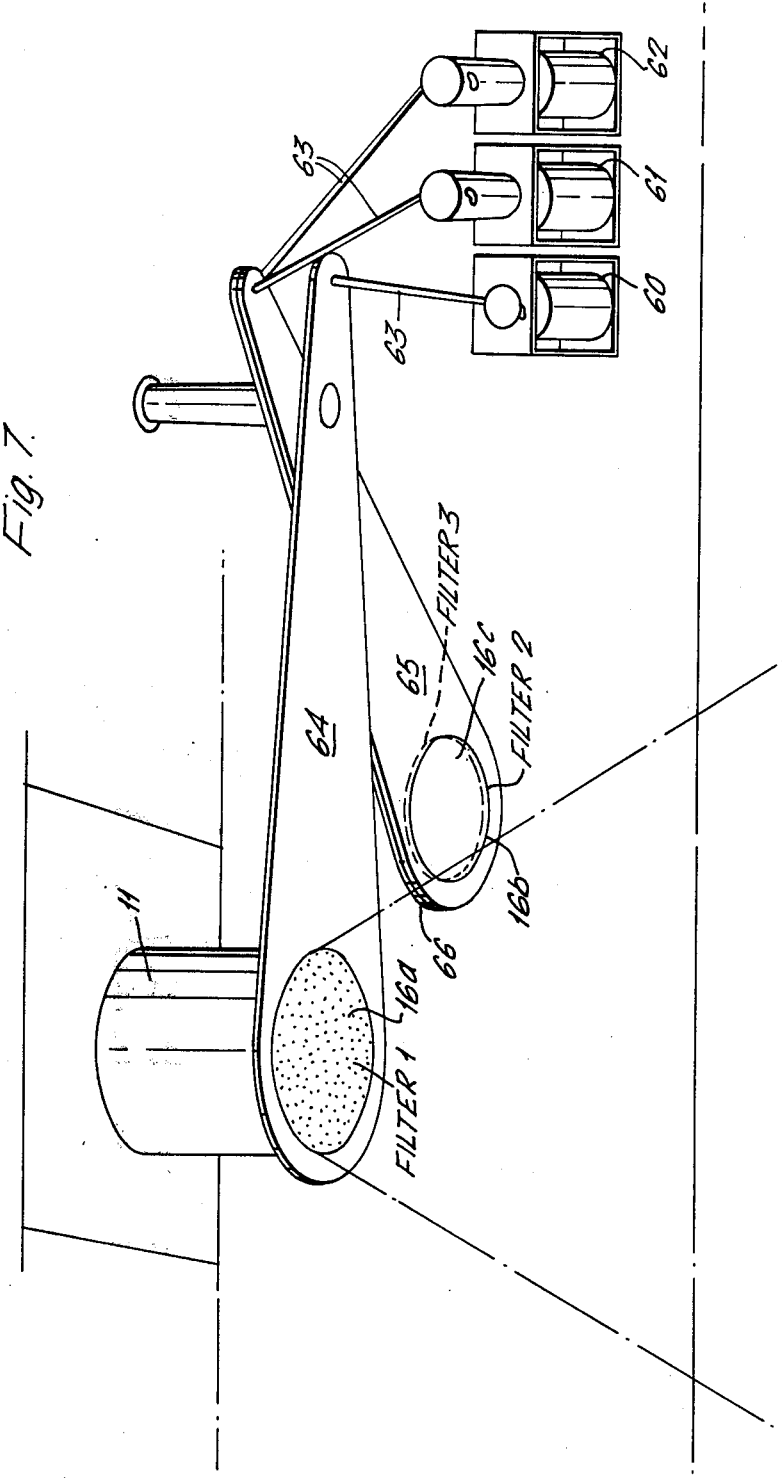

MICROFORM CAMERA

The present invention relates to a microform document and information recording camera such as a microfiche or microfilm camera.

In order to correct the response of photographic film, chiefly panchromatic film, when photocopying coloured documents or other information, so that when reproduced the record has a scale of tone corresponding to that seen by the eye, it is usually necessary to use one or more colour filters. Filtering results in less overall light reaching the film, therefore either the exposure must be increased or else the amount of light reflected off the object to be photographed must be increased or a combination of the two. Generally in known cameras the exposure is increased since this is easier. The increase in exposure is known as the exposure factor and this is conveniently assessed by means of a suitable table which takes into account the filter used, the colour of details such as print to be stressed when recording, the background colour of the document or information, the type of lighting used, i.e., incandescent or mercury vapour, and the type of film used. The number of variables make such tables complex and usually at best only produce approximate results.

An object of the invention therefore is to eliminate or reduce the necessity for such tables and to ensure an improved accuracy in the correction of the response of a particular film used to record a document or other records which are not necessarily limited to the visual light range and which may include holographic images or images reproduced on a cathode ray tube. Such a document, other records, information, or images will hereafter be referred to simply as 'a record'.

The invention consists in a microform camera for photographically copying a record having a film holder, a camera lens, a shutter, at least one lens filter mounted to a filter moving means for moving the filter between the lens and the front focal plane of the lens, shutter timing means, colour indicating means indicating predominant colours, a control means controlled by the colour indicating means which is arranged to set the shutter timing means to a correct exposure for the predominant colour and/or to actuate the filter moving means to insert the filter into the path between the lens and the front focal plane of the lens.

All the operator has to do to set the camera to record the record is thus to set the colour indicating means to the predominant colour of the record and the exposure and a filter or filters are provided as necessary in the path between the lens and the record. In this way an operator can be reasonably unskilled and the camera setting is speedy.

Preferably the colour indicating means includes two variable colour indicators, one of which is set to the colour of the details to be stressed and the other of which is set to the background colour of the record.

In the case of a camera which is only adapted to record documents the colour indicators which are preferably rotatable drums or wheels having a visual colour on the periphery are arranged to be manually rotatable. In the case of a camera which is adapted to record images from a source such as a cathode ray tube where the colours emitted can be predicted the colour indicating means can be automatically set depending on the mode of source in use. In the case of a camera which has the facility to record from sources such as a cathode ray tube as well as from conventional documents the colour indicating means can be set either automatically or manually.

In order to improve the correction of response on the film used it may be necessary to provide means for illuminating the record preferably supported or held on a record copying platen and means may be provided for varying the overall intensity of the illumination and/or varying the intensity of parts of the spectrum of the illumination by means of movable illumination filters the variation in overall intensity and/or variation in partial intensity can also be achieved by varying the number or type of lamps or other illuminating means. The means for illuminating the record with, if required, filters are preferably controlled by the control means controlled by the colour indicating means.

In the prefered embodiment there are several lens filters mounted on one or more rotatable plates adjacent the camera so that one or more filters can be inserted into the path between the lens and the record. Illuminating means is provided by means of lamps having differing spectral emissions in lamp housings on either side of a document platen. The lamp housings are provided with illumination filters which can be brought into use in the path between the lamps and the document platen by means of an illumination filter moving means which comprises a motor driving through a pinion onto a rack on a filter frame.

In one embodiment of the invention the two types of film can be accommodated within the camera with two sets of means for selecting the film and aligning the film with the camera lens so that if the record is outside the range of the spectral sensitivity of one type of film, the control means can select a second type of film having a different spectral sensitivity. This feature can also be used to provide black and white film or colour film as required. In a further alternative where the camera is adapted to record information from two differing sources such as conventional document or a cathode ray tube display or even a source such as X-rays where the source is outside the normal visual spectrum, then film appropriate to the source can be provided.

Figure 2:
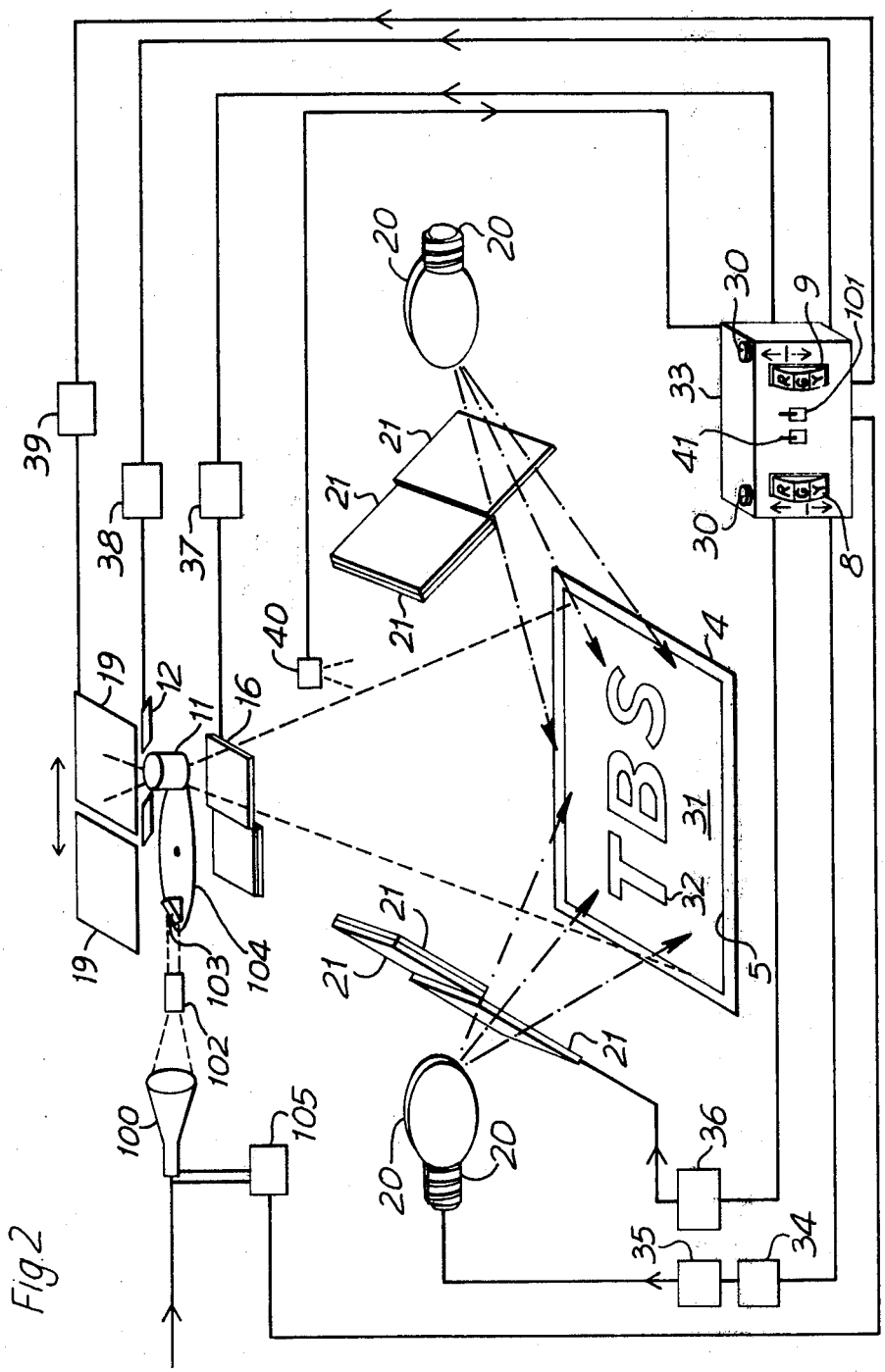
Figure 3:
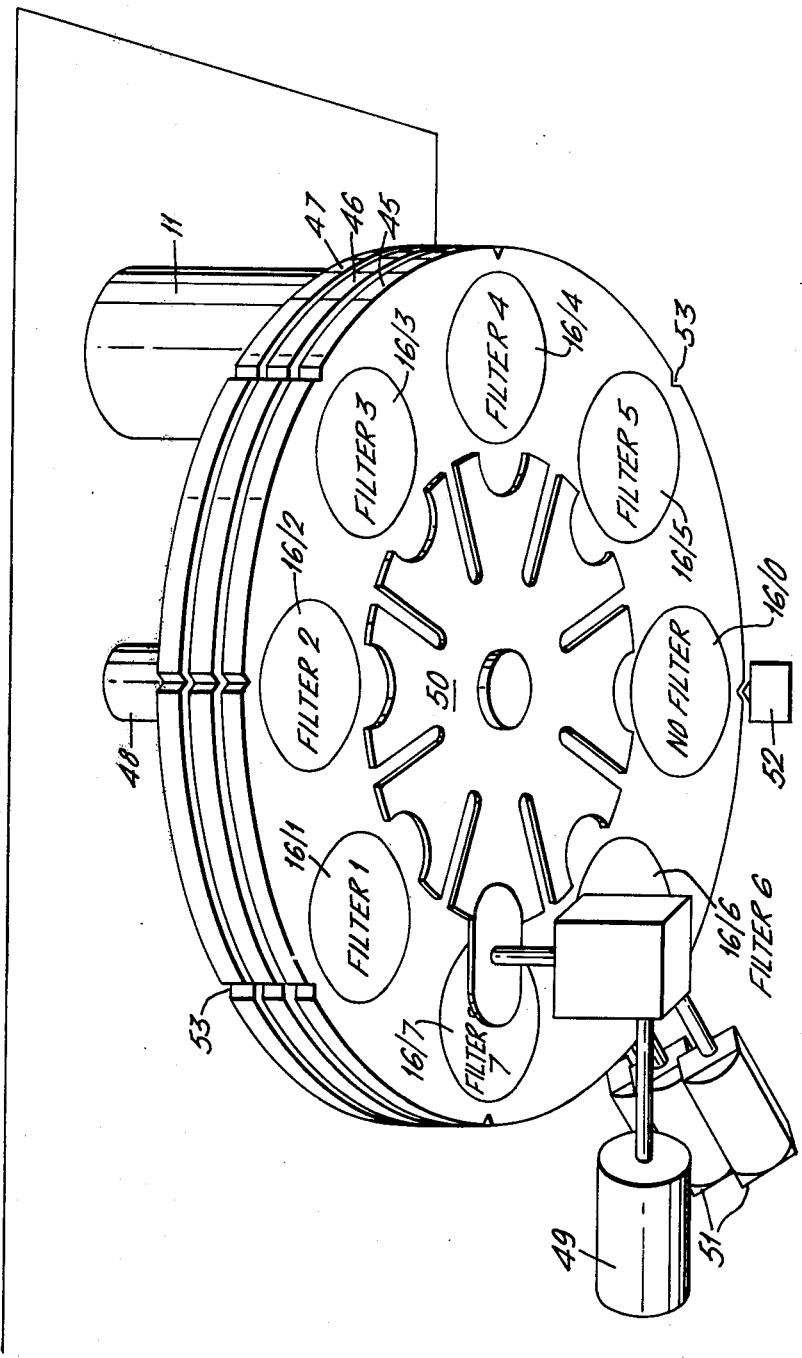
Figure 4:
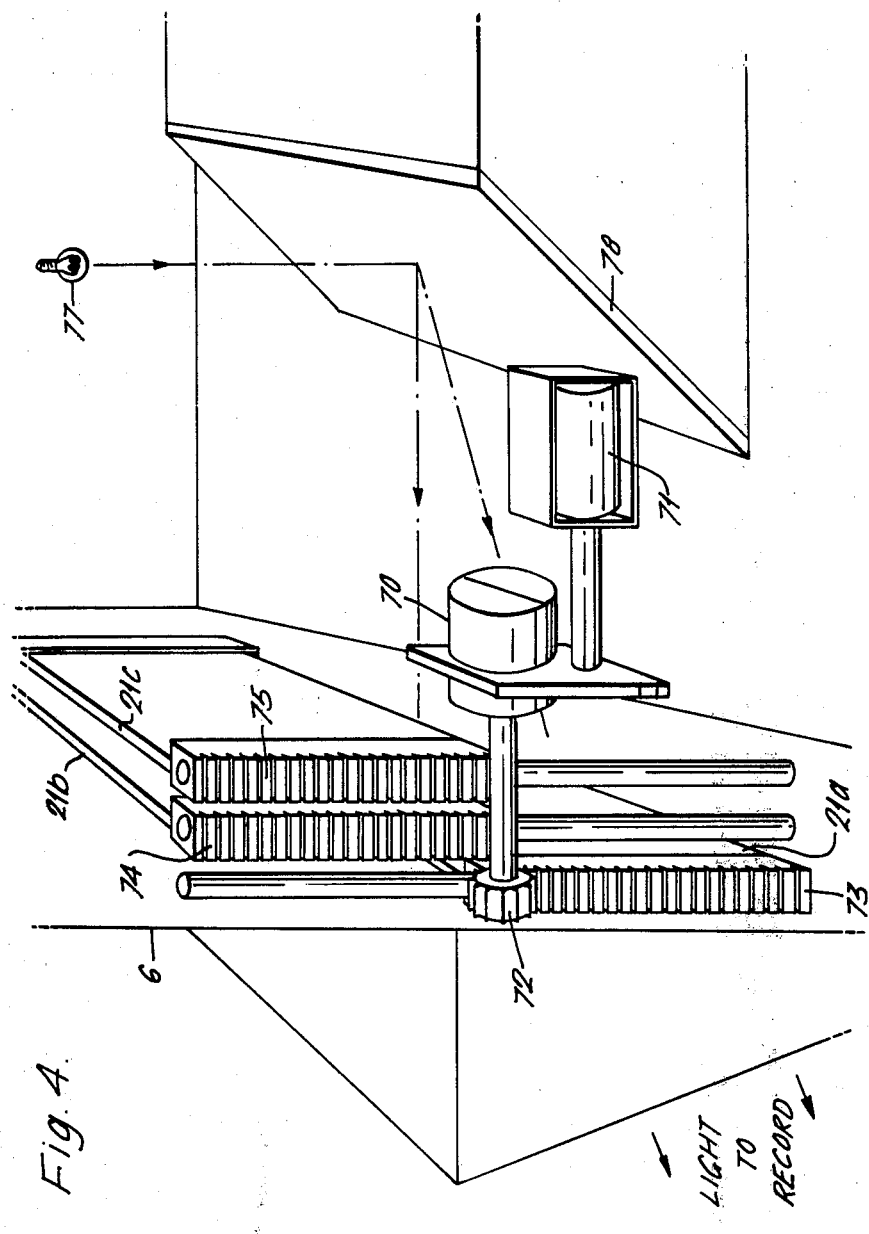

The invention will now be described with reference to the accompanying drawings in which:

FIG. 1 shows in a partly cut away elevation a microform camera in accordance with the invention, FIG. 2 shows schematically the arrangement of various features of the camera of FIG. 1, FIG. 3 shows a perspective view of camera filters mounted in a camera similar to that shown in FIG. 1, FIG. 4 shows a perspective view of illumination filters mounted in the camera shown in FIG. 1, FIG. 5 shows a perspective view of a film change mechanism for the camera of FIG. 1, FIG. 6 shows an alternative arrangement for the illumination filters shown in FIG. 4, and FIG. 7 shows an alternative arrangement for mounting the camera filters to that shown in FIG. 3.

In FIG. 1 there is shown a microform camera, which is specifically designed for microfiches use but it should be understood that the invention is equally applicable to microfilm cameras.

The camera is provided with a camera head 1 supported by columns 2 on a table 3 on which is a record copying platen 4 on which a record 5 is placed. Extending downwardly from the head 1 on both sides of the table 3 are lamp housings 6. The controls of the camera are provided on a control board 7 provided on a front surface of the table 3. The controls of the camera are not shown with the exception of those most relevant to the invention, namely two rotatable multi position switches 8 and 9 which will be discussed later which hereafter are called 'hue wheels' and which act as colour indicators.

Within the camera head 1 as shown in FIG. 1 there is mounted a camera lens 11, a camera shutter 12 which is any suitable shutter the exposure timing of which can be varied, and a film holder 13 which carries a film 19 being one of two types of film which are sheets of microfiche film held in stores 14 and 15. The mechanism for changing the film will be described later with reference to FIG. 5. Also mounted in the head 1 is a filter change mechanism carrying filters 16 which are arranged to be moved into a path 17 between the lens 11 and record 5. Not shown in the drawing but which is an optional extra to the camera is a cathode ray tube which displays information received from a data input. By means of mirrors the image on the cathode ray tube is projected through a further camera lens onto the film held on the holder 13. This is described in my U.S. Pat. No. 4,074,935. The image displayed is equally a record in the same sense as the record 5 which is a document. In place of a cathode ray tube display it is also possible to provide other types of image producing means, for instance a holographic image projector or a projector of non visual radiation of ultra violet frequency or lower or infra red or higher frequency.

In each lamp housing 6 are mounted illumination means comprising several lamps 20 which suitably include emitters of violet or ultra-violet or red or infrared radiation. The range of lamps provided in each housing should include lamps having spectral peaks suitably peaking at different peaks over the visual and just not visual spectrum. Though the peaks can be adjusted manually by removable filter covers. Fine control of the spectral range of radiation from the lamp housing is achieved by means of automatically controlled movable illumination filters 21, the mechanism being shown in FIG. 4, which will be described later. Radiation control is also accomplished by varying the intensity of the emission from the lamps which is achieved by known methods, for instance by a thyristor.

FIG. 2 shows the general control arrangement of the camera in which there are two hue wheels, 8 and 9. The hue wheels consist of manually rotatable drums or wheels having on their periphery the visual light spectrum. Each wheel has a fine setting control 30. An operator first sets the hue wheel 9 to the colour of the background 31 of the record 5 and then sets the hue wheel 8 to the colour of the print 32 on the record 5. Each colour has a precalculated setting for exposure, lens filter, light intensity, type of lamp, illumination filter, and type of film. The type of lamp is indicated by lamp number, for instance a red emitter may be lamp I and a tungsten incandescent lamp may be lamp IV. The precalculated settings are stored in a suitable memory in a control means 33. When the hue wheels are set, the precalculated settings are transmitted as orders to a light intensity control means 34, the number of lamps control 35 which also as previously said, controls the type of lamp, an illumination filter control means 36 selecting a filter 21, a lens filter control means 37 selecting a filter 16, a shutter timing control means 38 selecting the exposure time and a film change control 39 selecting the type of film 19. It may be necessary, after the controls have been set, to adjust the light intensity and this can be done by means of a photo-electric cell 40 which feeds back a correction order to the control means 33. It may also be necessary to override the film selection, for instance to order a colour film to be used instead of black and white film, and this can be done by means of an override switch 41. Alternatively a cathode ray tube 100 may be used to provide the image to be recorded on the film 19. It which case an overide switch 101 on the control means 33 is operated and this automatically sets the colour indicating means with precalculated settings held in a means 105 for automatically setting the colour indicating means. The image from the cathode ray tube passes onto the film 19 via a lens assembly 102 and mirror 103 on turret 104 in a manner disclosed in my U.S. Pat. No. 3,826,571. Lens 11 also being mounted on the turret 104.

Arrangements for changing the lens filters 16 will now be described with reference to FIGS. 3 and 7 which show two different arrangements.

In FIG. 3, the first arrangement, there are eight filter positions 16/0 to 16/7 on each of three filter discs or turrets 45, 46 and 47. Positions 16/1 to 16/7 each have a filter which on each turret are different, but similar filters may be provided on a different turret. Positions 16/0 has no filter so that by alignment of position 16/0 on each turret with the lens 11 the lens has no filter path between the lens and record. The turrets rotate about a shaft 48 and are rotated by a motor 49 driving a geneva wheel 50, which drives through clutches on the shaft 48 actuated by solenoids 51. Position sensors 52 (only one of which is shown) are positioned around each turret which co-operate with indentations 53 on the turret peripheries. By positioning the discs in the required position any filter or combination of filters or no filter can be selected.

In FIG. 7 a simple three filter arrangement is shown wherein three solenoids 60, 61 and 62 actuate through links 63 and arms 64, 65 and 66 respectively to bring filter positions 16a, b and c into the path of the lens 11. Thus by actuation of the solenoids either of three filters can be used or else if no solenoids are actuated, no filter is in the path of the lens 11.

FIGS. 4 and 6 show details of two different illumination filter arrangements. In FIG. 4 three filters 21a, b and c are moved by a motor 70 which can be moved into three positions by a solenoid 71 so that a pinion 72 driven by the motor 70 can engage on a selected rack 73, 74 or 75 to move filters 21a, b or c into a path between a light source 77 and the record 5. A mirror 78 is incorporated within the housing 6 to make the arrangement more compact. The motor 70 and solenoid 71 are controlled by means of the filter control means 36.

In FIG. 6 filters 21d, e and f and other filters if required, are carried on a strip 80 between drums 81 and 82 driven by a motor 83. The motor drives the strip 80 to position a selected filter 21 into the path between a light source 84 and the record 5. The position is controlled by means of the filter control means 36 and a sensor 86 acting on perforations 87 on one side of the strip 80. A mirror 88 similar to mirror 78 in the FIG. 4 arrangement is provided in the housing 6.

In order to change the type of film an arrangement such as is shown in FIG. 5 is provided.

In FIG. 5 two sheet film stores 90 and 91 are shown. Above the stores a vacuum platen 92 is moved by means of helical activators 93 and 94 for X and Y directions. Movement of vacuum platens and the method of picking up a sheet of film is fully described in my U.S. Pat.

Nos. 4,026,652, 4,042,300 and 4,099,867. A particular store 90 or 91 is then selected by driving the activators controlled by the film change control means 39.

Not shown in the drawing but which has been described in my previous patents and U.S. Pat. No. 4,027,968, are arrangements for changing the camera lens to be used. Depending on the type of record used it may be necessary to change the lens. Also not described are arrangements for moving the film from frame to frame. Such arrangements are described in my previous U.S. Pat. No. 3,628,865, mainly in respect of microfiche film, but any suitable microfilm moving and changing arrangement can be used.

It will be appreciated that in use the camera may for some records hardly need correcting at all, so that some of the variable control devices are not needed, while for some records most or all devices are needed.

I claim:

1. A microform camera for photographically copying a record comprising;
    a camera lens,
    a shutter associated with said lens,
    a film holder adapted to move microform film through the back focal plane of said lens for recording successive images on said film,
    at least one lens filter mounted to a filter moving means for moving the filter between said lens and the front focal plane of the lens,
    shutter timing means for timing the opening of said shutter,
    first colour indicating means settable to correspond to the colour of the background of the record to be copied,
    second colour indicating means settable to correspond to the predominant colour of the record, and
    control means controlled by said first and second colour indicating means which is arranged to set said shutter timing means to a correct exposure for said predominant colour and to actuate said filter moving means to insert the said filter between said lens and the front focal plane of the lens.

2. A camera as claimed in claim 1 wherein said first and second colour indicating means each comprise a manually rotatable drum having different predominant colours on its circumference.

3. A camera as claimed in claim 1 further comprising a cathode ray tube arranged to receive images for recording on a film in said film holder and means for automatically setting said colour indicating means when said cathode ray tube is operated.

4. A camera as claimed in claim 1 further comprising a document copying platen located in said front focal plane of the lens, illumination means directable on said copying platen and means for varying the overall intensity of illumination from said illuminating means, said illumination intensity varying means responsive to said control means.

5. A camera as claimed in claim 4 further comprising means for varying the intensity of parts of the spectrum of the illumination provided by said illuminating means, said spectrum intensity varying means responsive to said control means.

6. A camera as claimed in claim 5 wherein the means for varying the intensity of parts of the spectrum comprises movable lamp filters locatable in a pathway between the said illuminating means and said document copying platen by means of a filter control, said filter control being controlled by said control means which in turn is controlled by said first and second colour indicating means.

7. A camera as claimed in claim 6 wherein said lamp filters are movable by means of racks connected to the lamp filters and actuated by means of a pinion arranged to be movable from one rack to another by an actuator and driven by a motor.

8. A camera as claimed in claim 6 wherein said lamp filters are provided on a flexible strip arranged to be driven between drums.

9. A camera as claimed in claim 4 wherein said illuminating means comprises a plurality of lamps having differing spectral emissions mounted in a lamp housing on either side of said copying platen, and wherein said control means is enabled to select one or more of the lamps by means of a lamp control selection device.

10. A camera as claimed in claim 4 wherein said illumination means comprises a plurality of lamps and wherein said illumination intensity varying means controls the intensity of the emission from said lamps.

11. A camera as claimed in claim 1 further comprising a plurality of lens filters mounted on said filter moving means.

12. A camera as claimed in claim 1 wherein said filter moving means comprises one or more rotatable plates.

13. A camera as claimed in claim 1 wherein the said filter moving means comprises arms actuated for pivotal movement into the path between the lens and the front focal plane of the lens by means of actuators, said filters being mounted to one extremity of each said arm.

14. A camera as claimed in claim 1 wherein a plurality of film stores are provided and means are provided for selecting a particular film from a selected said store.

15. A microform camera for photographically copying a record on a film comprising:
    a camera lens,
    a cathode ray tube arranged to receive images for recording by the camera,
    an optical deflector for deflecting said images onto said film,
    a rotatable lens carrier on which is mounted said camera lens on said optical deflector, the carrier being arranged to be rotated for recording an image either from the camera lens or the cathode ray tube,
    a shutter associated with said lens or said optical deflector,
    a film holder adapted to move said film through the back focal plane of said lens for recording successive images of said film,
    at least one lens filter mounted to a filter moving means for moving the filter between said lens and the front focal plane of the lens,
    shutter timing means for timing the opening of said shutter,
    colour indicating means indicating predominant colours to be copied,
    control means controlled by said colour indicating means which is arranged to set said shutter timing means to a correct exposure for said predominant colour and to actuate said filter moving means to insert the said filter between said lens and the front focal plane of the lens, and
    means for automatically setting said colour indicating means when said cathode ray tube is operated.

* * * * *